United States Patent [19]

Jelinek et al.

[11] 4,226,431

[45] Oct. 7, 1980

[54] SEALING DEVICE FOR SCREW THREADS

[75] Inventors: Jerry G. Jelinek, La Habra; Orville J. Bain, Van Nuys, both of Calif.

[73] Assignee: Parker-Hannifin Corporation, Cleveland, Ohio

[21] Appl. No.: 955,996

[22] Filed: Oct. 30, 1978

Related U.S. Application Data

[63] Continuation-in-part of Ser. No. 884,862, Mar. 9, 1978, Pat. No. 4,159,118.

[51] Int. Cl.$^3$ .................... F16J 15/16; F16H 55/22
[52] U.S. Cl. ................................ 277/165; 277/179; 74/459
[58] Field of Search ............... 277/179, 189, 183, 184, 277/165, 153; 74/459

[56] References Cited

U.S. PATENT DOCUMENTS

| | | |
|---|---|---|
| 2,249,142 | 7/1941 | Johnson . |
| 2,883,224 | 4/1959 | Riesing et al. ................. 277/179 |
| 3,180,650 | 4/1965 | Liebig ............................. 277/179 |
| 4,053,167 | 11/1977 | Jelinek .......................... 277/165 |
| 4,079,951 | 3/1978 | Sievenpiper .................. 277/165 |

FOREIGN PATENT DOCUMENTS 727814 4/1955 United Kingdom .

*Primary Examiner*—Robert I. Smith
*Attorney, Agent, or Firm*—James A. Baker

[57] ABSTRACT

A sealing device for preventing fluid leakage between a screw and a nut threaded thereon. The thread on the screw includes a cylindrical crest and a helical rounded groove. The device includes an annular elastomeric member having inner and outer peripheral surfaces. The inner peripheral surface includes an axially extending sealing surface which engages the thread crest and a radially inwardly extending sealing projection which engages the thread groove. A relatively rigid support member is radially aligned with the axially extending sealing surface for resisting radially inward deflection thereof. The support member is discontinued at a location aligned with the sealing projection, so that the sealing projection can be radially inwardly deflected by fluid pressure to tightly seal against the thread groove.

13 Claims, 8 Drawing Figures

SEALING DEVICE FOR SCREW THREADS

BACKGROUND OF THE INVENTION

This application is a continuation-in-part of U.S. patent application Ser. No. 884,862 filed Mar. 9, 1978, now U.S. Pat. No. 4,159,118, the entirety of which is incorporated herein by reference.

U.S. Pat. No. 4,053,167 discloses a sealing device for preventing fluid leakage between a screw and a nut, particularly of the ball screw type. The sealing device shown in the patent is mounted between a screw and a nut and has a projection and ribs on its inner surface to seal against the screw thread. It is satisfactory for low fluid pressures such as up to 500 psi. However, it may not always be satisfactory for high pressures because it utilizes a solid block of elastomeric material that seals against the nut and does not utilize fluid pressure to aid in such sealing.

Other sealing devices are shown in U.S. Pat. No. 2,249,141 and British Pat. No. 727,814. Both of these patents disclose sealing devices which include elastomeric members and relatively rigid support members.

SUMMARY OF THE INVENTION

The present invention is an improvement over the device shown in U.S. Pat. No. 4,053,167 in that it is suitable for higher pressures, such as at least 500 psi. The improved device includes an annular elastomeric member having inner and outer peripheral surfaces and axial end faces. The inner peripheral surface is arranged for sealing engagement with the screw and includes an axially extending sealing surface and a radially inwardly extending sealing projection.

A generally flat relatively rigid support member is arranged adjacent at least one of the end faces of the elastomeric member. The support member includes an axially extending support portion disposed in radially outward alignment with the axially extending sealing surface of the elastomeric member. This arrangement resists radially inward deflection of the elastomeric member caused by fluid pressure acting on the outer peripheral surface of the elastomeric member, and thereby precludes cutting of the inner peripheral surface of the elastomeric member by the sharp edges of the screw threads. The support member is arranged so that it does not resist radially inward deflection of the sealing projection of the elastomeric member. This arrangement insures that fluid pressure acting on the outer peripheral surface of the elastomeric member urges the sealing projection into tight sealing engagement with the thread groove formed in the screw.

BRIEF DESCRIPTION OF THE DRAWINGS

These and other features and advantages of the invention are incorporated in the preferred embodiments of the invention shown in the drawings, wherein.

DETAILED DESCRIPTION OF THE DRAWINGS

Figure 1:
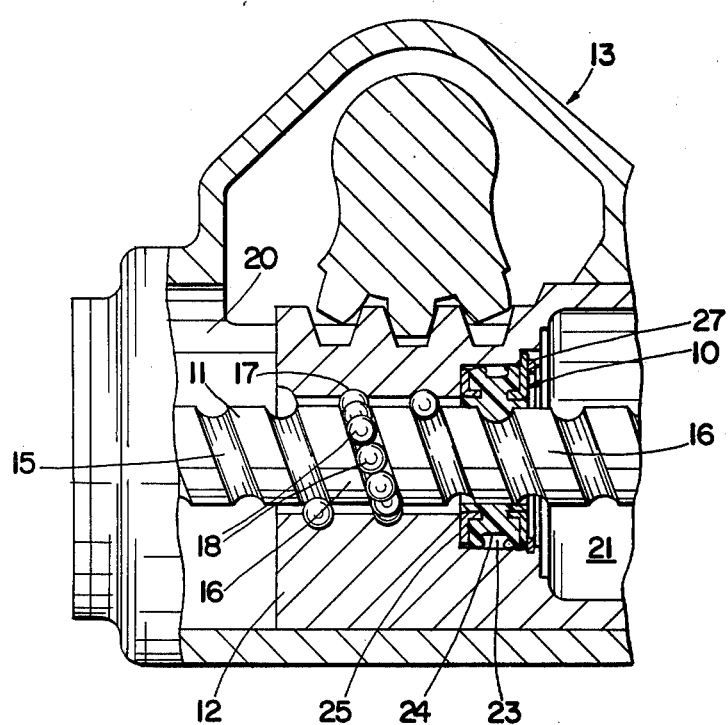
FIG. 1 is a fragmentary sectional view of a power steering assembly having a sealing device in accordance with the invention.

Referring now to the drawings in greater detail, FIG. 1 shows a sealing device 10 used, for example, to prevent fluid leakage between a screw 11 and a nut 12 in a power steering unit 13. The screw 11 is mounted for rotational movement and is secured against axial movement, while the nut 12 is secured against rotational movement but may move axially. The screw 11 has a helically progressing rounded thread groove 15 and a cylindrical helically progressing thread crest 16 next to the groove. The nut 12 has a complimentary helically progressing groove 17. A series of balls 18 are disposed within the grooves 15 and 17 to provide threaded engagement between screw 11 and nut 12 in an arrangement commonly referred to as a ball screw. The balls provide very low friction between the screw and the nut when one is turned relative to the other.

During operation of the power steering unit 13, fluid under pressure is in a first chamber 20 when the vehicle is to turn in one direction and is in a second chamber 21 when it is to turn in the other direction. At such times, the nut 12 moves axially first to the right and then to the left while the screw 11 rotates first in one direction and then in the opposite direction. The sealing device 10 at all times acts between the nut 12 and the screw 11 to prevent leakage of pressurized fluid from one chamber to the other. As shown in FIG. 1, the sealing device 10 is mounted in a cylindrical recess 23 that has a cylindrical wall 24 and a radial end wall 25. The sealing device is retained in the recess 23 by a snap ring 27.

Figure 3:
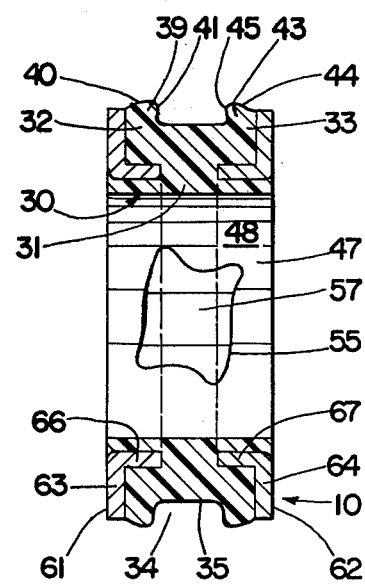
FIG. 3 is a cross-sectional view of the sealing device along line 3—3 of FIG. 2.
Figure 2:
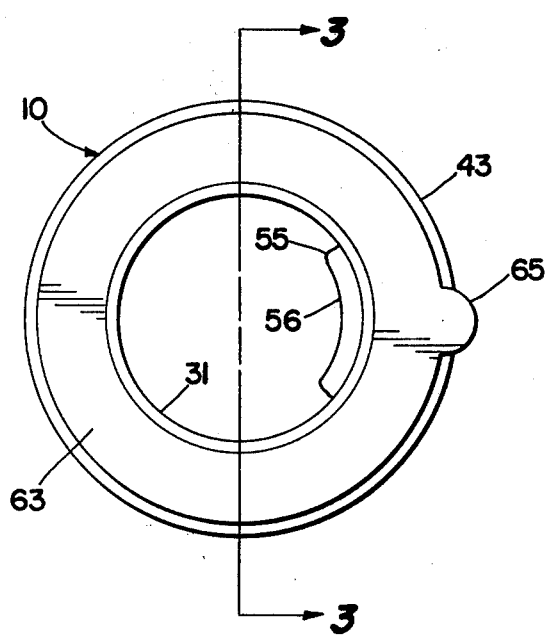
FIG. 2 is an end view of the sealing device.

Referring now to FIGS. 2 and 3, the sealing device 10 includes an annular ring 30 of elastomeric material. The elastomeric ring 30 has a base 31, and first and second annular lips 32 and 33 extend radially outwardly to define a recess 34 having a bottom surface 35. The radially outer tip 39 of lip 32 is tapered as at 40 on its axially outer side and is rounded as at 41 on its axially inner side. Similarly, the radially outer tip 43 of lip 33 has a tapered axially outer face 44 and a rounded inner face 45.

The elastomeric member 30 includes an inner peripheral surface 47. The inner peripheral surface 47 includes an axially extended cylindrical sealing surface 48 for sealingly engaging the thread crest. The diameter of the axially extending cylindrical sealing surface 48 prior to insertion in the power steering unit 13 is somewhat smaller than the diameter of the thread crest 16. This assures that the cylindrical sealing surface 48 will be deformed into tight sealing engagement with the thread crest 16 when assembled in the power steering unit 13.

The inner peripheral surface 47 also includes a radially inwardly extending sealing projection 55 that has a rounded surface 56 for sealingly engaging the rounded thread groove 15. Prior to insertion in the power steering unit 13, the cross-sectional radius of the rounded surface 56 is slightly greater than that of the groove 15 so that the rounded surface 56 deforms somewhat and is in firm sealing engagement with the groove 15 when installed in the manner shown in FIG. 1. The projection 55 extends helically with the same pitch as the groove 15, but the projection 55 extends only through a circumferential arc of about 75°. The projection 55 is radially opposite the recess 34 in the outer peripheral surface of the elastomeric member 30.

Still referring to FIGS. 1–3, the seal device 10 also includes first and second support members 61 and 62 which are of metal or other material that is more rigid than the elastomeric ring 30. The support members 61 and 62 include generally flat washer like portions 63 and 64, respectively. The support members 61 and 62 are identical to one another, with the exception that the portion 64 of the support member 62 includes a radially projecting tab 65 which is received in a complimentary slot in the nut 12 to prevent rotational movement of the sealing device 10 relative to the nut 12.

The support members 61 and 62 also include axially extending annular support portions 66 and 67, respectively. The axially extending annular support portions 66 and 67 are radially aligned with at least a major portion of the axially extending cylindrical sealing surface 48. The support portions 66 and 67 are interrupted and spaced apart so that they do not provide radial support for at least a major portion of the radially inwardly extending projection 55.

Figure 4:
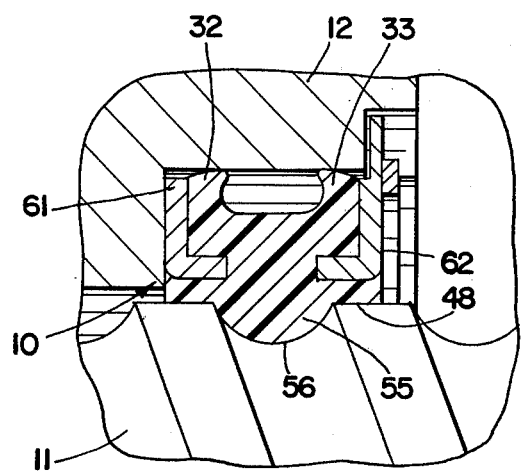
FIG. 4 is a fragmentary cross-sectional view of the sealing device before fluid pressure is applied.

Referring now to FIG. 4, when there is no fluid pressure acting on the sealing device 10, the tips 39 and 43 of the lips 32 and 33 will be in light sealing contact with the recessed bore wall 24. Additionally, the cylindrical sealing surface 48 will maintain sealing engagement with the thread crest 16 and the rounded surface 56 will maintain sealing engagement with the rounded thread groove 15.

Figure 5:
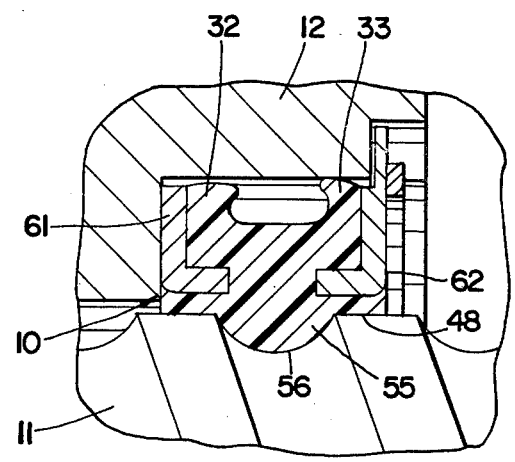
FIG. 5 is a view like FIG. 4 but with fluid pressure applied from one end of the assembly.

Referring now to FIG. 5, when a greater fluid pressure exists in chamber 20 than chamber 21, fluid from chamber 20 will travel along the outer surface of screw 11 within the nut 12 until it reaches the sealing device 10. Some of the fluid will force its way between the support member 61 and the wall 25 to deflect tip 39 of lip 32 axially to the right and radially downwardly out of contact with wall 24 to enter recess 23. The pressurized fluid in recess 34 will then press radially inwardly on the elastomeric member 30. The axially extending annular support portions 66 and 67 under this condition resist radially inward deflection of the cylindrical sealing surface 48. This arrangement prevents the sharp corners defined at the juncture of the thread grooves 15 and thread crest 16 from cutting into the elastomeric member 30. However, because the annular support portions 66 and 67 are discontinued at a location radially outwardly aligned with the projection 55, the pressure in the recess 34 pushes the rounded surface 56 into tight sealing engagement with the thread groove 15. At the same time, the pressurized fluid within the recess 34 presses axially against tip portion 43 of lip 33 and, because of the specific shaping of tip portion 43 and the backing up of lip 33 by the support member 62, tip 43 will be deformed into tighter engagement with recess wall 24.

Figure 6:
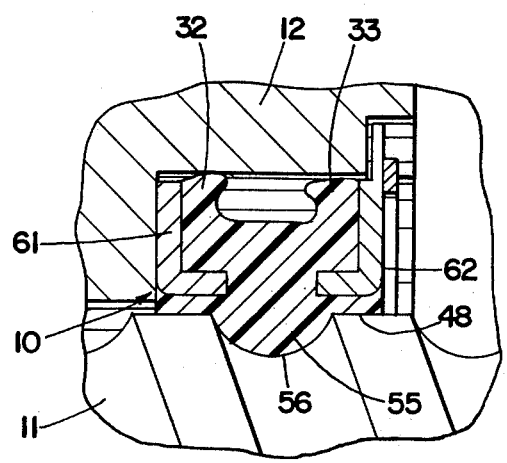
FIG. 6 is a view like FIG. 4 but with fluid pressure applied from the other end of the assembly.

As shown in FIG. 6, when a higher fluid pressure exists in chamber 21 than in chamber 20, fluid from chamber 21 will deflect tip portion 43 of lip 33 out of contact with recess wall 25 to enter recess 23 and press tip portion 39 of lip 32 into tighter sealing contact with wall 24. In this case, the support members 61 and 62 and the cylindrical sealing surface 48 and the rounded surface 56 perform in the manner described in the previous paragraph.

Figure 7:
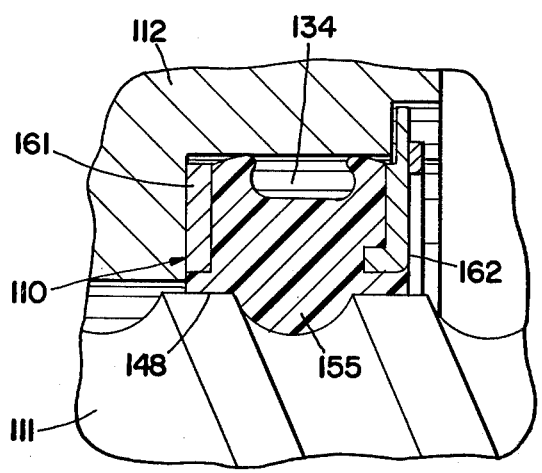
FIG. 7 is a fragmentary cross-sectional view of a second embodiment of the invention.
Figure 8:
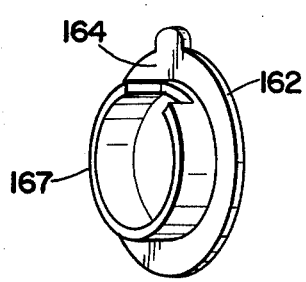
FIG. 8 is a perspective view of a support member utilized in the sealing device shown in FIG. 7.

In the form of the invention shown in FIGS. 7 and 8, the support member 161 includes only a generally flat washer like portion and does not include an axially extending support portion. A support member 162, however, includes a generally flat washer like portion 164 and an axially extending annular support portion 167. The axially extending annular support portion 167 is radially outwardly aligned with substantially the entire cylindrical sealing surface 148 of elastomeric member 130. However, the axially extending annular support portion 167 is discontinued at a location radially outwardly aligned with the radially inwardly extending projection 155.

By this arrangement, the annular support portion 167 resists radially inward deflection of the cylindrical sealing surface 148 to prevent the sharp corner defined by the juncture of the thread crest 116 and thread groove 115 from cutting into the elastomeric member 130. However, because the annular support portion 167 is discontinued at a location radially outwardly aligned with the projection 155, fluid pressure in the recess 134 pushes the projection 155 into tight sealing engagement with the thread groove 115.

Although the sealing device 10 has been illustrated and described with ball type screw threads, it may be adapted for other types of threads, such as acme, V or square threads but with projection 55,155 modified to fit the particular thread form.

What is claimed is:

1. A sealing device for sealing between first and second telescoped parts, said device comprising an annular elastomeric member having inner and outer peripheral surfaces, said inner peripheral surface being arranged for sealing engagement with one of said parts and including an axially extending sealing surface and a radially inwardly extending sealing projection, said sealing projection extending through an arc of predetermined circumferential extent, a relatively rigid axially extending support disposed in radially outward alignment with said axially extending sealing surface, said support being discontinued for a predetermined circumferential extent at a location in radially outward alignment with said projection, and said circumferential extent of said discontinuity being substantially as great as said circumferential extent of said sealing projection.

2. The device of claim 1 in which said support is disposed in radially outward alignment with at least a major portion of said axially extending sealing surface, and said support is discontinued at a location in radially outward alignment with at least a major portion of said projection.

3. The device of claim 1 in which said support includes two relatively rigid annular support members.

4. The device of claim 3 in which said annular elastomeric member includes axial end faces, each of said support members includes a generally flat portion adjacent one of said end faces and a flange portion extending axially from said flat portion.

5. The device of claim 1 in which said support device includes an axially extending generally cylindrical ring imbedded in said elastomeric member, and said ring is discontinued for substantially the entire circumferential extent of said projection.

6. The device of claim 1 in which said elastomeric member includes a base, first and second lips which extend radially outward from said base and are axially spaced from one another to form an annular recess therebetween, and said sealing projection and said discontinuity are each disposed in radially inward alignment with said recess, whereby fluid pressure communicated past said lips to said recess urges such sealing projection radially inwardly.

7. A sealing device for sealing between first and second telescoped parts, said device comprising an annular elastomeric member having inner and outer peripheral surfaces, said inner peripheral surface being arranged for sealing engagement with one of said parts and including an axially extending sealing surface and a radially inwardly extending sealing projection, said sealing projection extending through an arc of predetermined extent, said arc being less than 360 degrees, a relatively rigid support at least partially imbedded in said elastomeric member, said support having an axially extending portion disposed in radially outward alignment with said axially extending sealing surface for resisting radially inward deflection of said axially extending sealing surface, and said elastomeric member being unsupported by such support at a location in radially outward alignment with at least a major portion of said circumferential extent of said projection for permitting radially inward deflection of said projection.

8. The device of claim 7 in which said axially extending support portion is of continuous cylindrical configuration.

9. The device of claim 7 in which said axially extending support portion is of generally cylindrical configuration and is discontinued and interrupted for substantially the entire circumferential extent of said sealing projection.

10. In combination, a threaded together screw and nut, said nut having a bore with a cylindrical wall, said screw having a thread with a groove and a crest, a sealing device within said bore, said device comprising an elastomeric member having an inner peripheral surface and an outer peripheral surface, said inner peripheral surface being in sealing engagement with said screw, said inner peripheral surface including an axially extending sealing surface engaging said crest and a radially inwardly extending sealing projection engaging said groove, a relatively rigid axially extending support device disposed in radially outward alignment with said axially extending sealing surface for resisting radially inward deflection of said axially extending sealing surface, said support being discontinued and interrupted for substantially the entire circumferential extent of said projection at a location in radially outward alignment with said projection for permitting radially inward deflection of said projection.

11. The combination with claim 10 in which said screw and nut each include a cylindrical crest and a rounded groove, and the juncture of said cylindrical crest and said rounded groove defines a sharp corner.

12. The combination of claim 10 in which said support device includes two support members, each support member has a generally flat portion and an axially extending flange portion of generally cylindrical configuration.

13. The combination of claim 10 in which said support device includes a generally cylindrical member embedded in said elastomeric member, and said generally cylindrical member is discontinued and interrupted for substantially the entire circumferential extent of said sealing projection at a location in radially outward alignment with said sealing projection.

* * * * *